April 26, 1960 G. E. FRANCK 2,934,209
DEHYDRATOR
Filed June 22, 1956
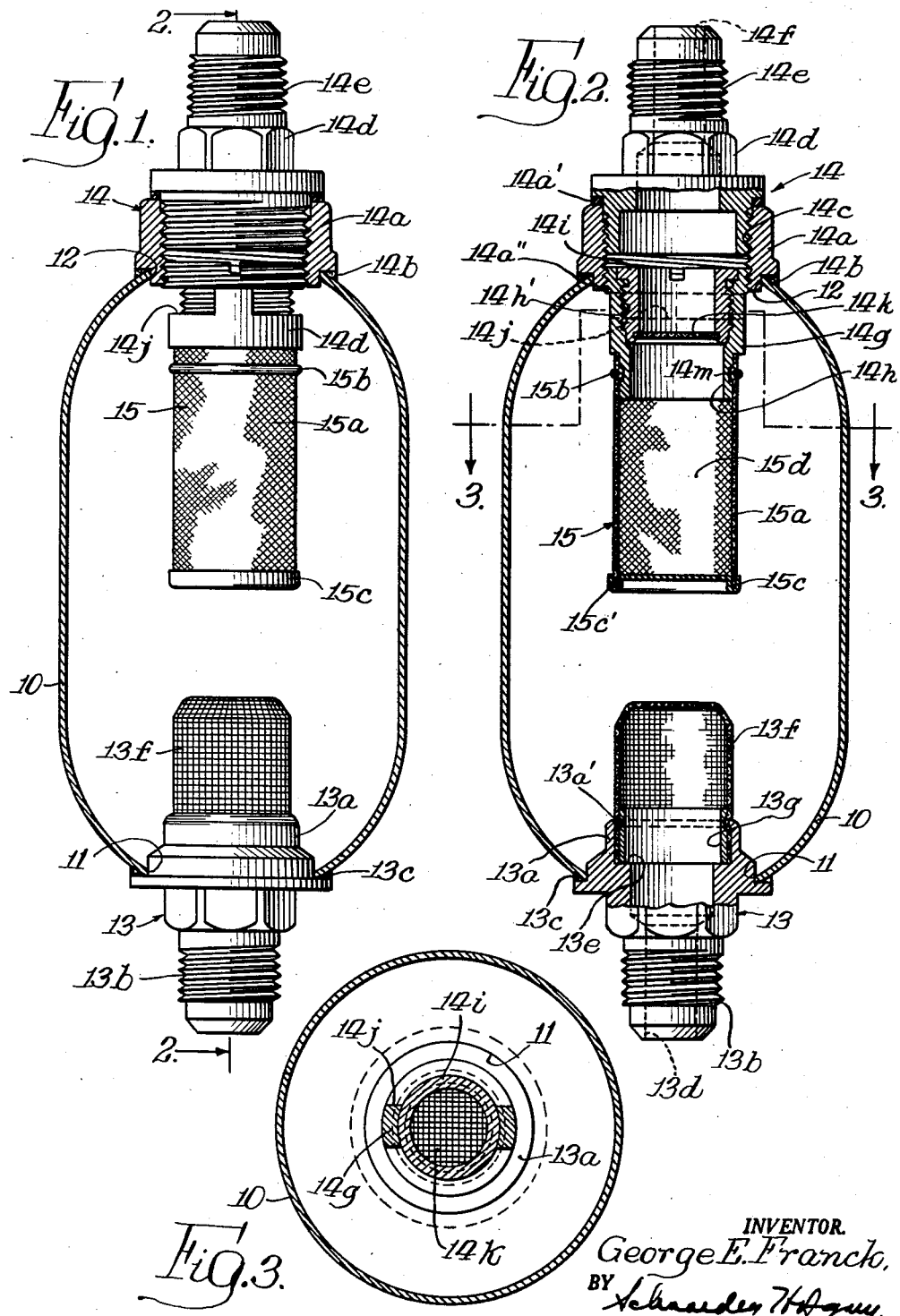
INVENTOR.
George E. Franck,
BY
Schroeder, Hofgren,
Brady & Wegner Attys.

United States Patent Office 2,934,209
Patented Apr. 26, 1960

2,934,209

DEHYDRATOR

George E. Franck, Riverside, Ill., assignor to Imperial Brass Manufacturing Company, a corporation of Illinois Application June 22, 1956, Serial No. 593,085

8 Claims. (Cl. 210—266)

This invention relates to a fluid dehydrator and in particular to a dehydrator having new and improved filtering means.

A common form of dehydrator found in the art is that comprising a hollow shell filled with suitable desiccant and through which fluid to be dehydrated is passed. While such a dehydrator operates properly when the desiccant is fresh and clean, contaminants in the fluid, such as oil and suspended particulate material, cause a decrease in the ability of the desiccant to remove the water from the fluid. Because the desiccant comprises a continuous medium, the deterioration occurs throughout and, as surface phenomena are involved in the proper dehydrating action of the normal desiccant, a small amount of oil coating quickly renders the desiccant unusable.

The principal object of applicant's invention is to provide a new and improved dehydrator arranged effectively to preclude contamination of the entire body of desiccant by oil and similar undesirable materials in the fluid being dehydrated.

Another object is to provide such a dehydrator wherein a chamber forming means is provided within the dehydrator shell to separate the desiccant contained therein into two physically separated portions whereby contaminant filtering action is effectively limited to one of said portions.

A further object is to provide such a dehydrator wherein the chamber forming means includes a screen or filter portion.

A still further object is to provide a dehydrator having a chamber interposed between the outlet and the main interior portion of the shell, with controllable means for allowing the concurrent filling of the chamber and shell interior with dessicant, said means being closable to restrict flow of fluid from the interior of the shell to the outlet through the chamber.

Still another object is to provide such a dehydrator wherein the fluid is strained on entering and leaving the dehydrator shell with the straining means at the inlet to the dehydrator comprising a cup-shaped screen having a substantial cumulative opening area.

Other features and advantages of this invention will be apparent from the following description taken in connection with the accompanying drawings wherein:

Figure 1 is an elevational view of a dehydrator embodying the invention with portions thereof shown in diametric section;

Figure 2 is a sectional view taken approximately along the line 2—2 of Figure 2; and Figure 3 is a sectional view taken approximately along the line 3—3 of Figure 2.

In the exemplary embodiment of the invention as disclosed in the drawings, a fluid dehydrator is shown to comprise a shell 10 having an inlet opening 11 and an outlet opening 12. Sealingly secured to the shell at inlet opening 11 is a connecting means 13 arranged for connection thereto of a suitable inlet duct (not shown). Sealingly secured to the shell at outlet 12 is a connecting means 14 arranged for connection thereto of a suitable outlet duct (not shown). Secured to connecting means 14 to be received within shell 10 is a chamber forming means 15 acting to separate physically desiccant received within the chamber forming means from desiccant within shell 10 exteriorly of the chamber forming means. Connecting means 14 is further arranged so that desiccant material may be admitted into the shell with chamber forming means 15 in place therein thereby allowing a complete filling of the dehydrator with desiccant.

Shell 10 comprises a hollow elongated member formed of a rigid material such as copper. Inlet opening 11 is formed at one end of the shell and outlet opening 12 is formed in the opposite end thereof so that flow through the dehydrator will be generally linear. Inlet connecting means 13 comprises a tubular fitting which extends through inlet opening 11 to have a generally tubular inner end 13a within shell 10, and an exteriorly threaded outer end 13b without shell 10 adapted for threaded connection thereto of a suitable duct (not shown). To assure a tight sealed relationship therebetween, connecting means 13 may be secured to the shell by means such as solder 13c. A bore 13d extends longitudinally through connecting means 13 and is stepped within inner end 13a to form a radially extending shoulder 13e.

A cup shaped strainer 13f is secured to connecting means 13 in bore 13d to extend longitudinally from tubular end 13a into shell 10. The strainer may be formed of a fine mesh material such as #80 mesh×#38 O.E. gauge Monel wire cloth. To secure the strainer to connecting means 13, a clamping ring 13g is received in the open end of the strainer and the assembly is disposed in fitting inner end 13a. Tip 13a' of the fitting inner end is crimped radially inwardly to clamp the strainer tightly around ring 13g and hold ring 13g against shoulder 13e. Strainer 13f is made sufficiently long so that it presents a substantial area relative to the cross sectional area of bore 13d, thereby precluding retardation of the liquid flow into the dehydrator at the inlet. The fine mesh structure of the strainer acts to strain out particulate material in the liquid prior to its entry into the filter, and further acts to prevent passage of the desiccant backwardly therethrough thus serving as means for retaining the desiccant within the dehydrator at the inlet.

Outlet connecting means 14 comprises an annular or generally tubular member 14a sealingly secured to shell 10 at outlet opening 12 by means such as solder 14b. Extending longitudinally through member 14a is a bore 14c which is threaded to receive in its outer portion a complementarily exteriorly threaded connecting fitting 14d. To secure fitting 14d to member 14a in sealed relationship, a suitable annular washer 14a' may be provided. At its outer end, fitting 14d is provided with an exteriorly threaded portion 14e which is adapted to allow connection thereto of a suitable duct (not shown). Extending longitudinally completely through fitting 14d is a bore 14f which, when fitting 14d is secured to member 14a, is in communication with bore 14c.

Threadedly secured to member 14a at the inner end of bore 14c to extend into shell 10 is an annular support 14g. To limit the threaded insertion of member 14g through member 14a the inner end of member 14a in bore 14c may be prick punched as at 14a''. A bore 14h extends longitudinally through support 14g and is threaded at the outer end 14h' to receive a tubular plug 14i. Support 14g is cut away adjacent threaded end 14h' to form as least one lateral or radial passage 14j, which passage is closed when plug 14i is threadedly inserted into support 14g as seen in Figure 2. Extending transversely across the inner end of plug 14i is a strainer 14k which may be formed of a material similar to that of strainer 13f and which acts to strain the fluids passing from the dehydrator and to retain the desiccant therewithin.

Chamber forming or enclosure means 15 comprises a perforate tubular sleeve 15a formed of a filtering material such as fine mesh nylon cloth. At its outer end, sleeve 15a is secured around the inner end of support 14g by means of a ring 15b formed of a resilient material such as music wire and extended around the sleeve to force it into an annular groove 14m provided in the exterior surface of the inner end of annular support 14g. The inner end of sleeve 14a is closed by means of a ferrule 15c which may be formed of a material such as sheet brass, the periphery 15c' of which is crimped over to clamp the end of the sleeve sealingly thereto. The resultant chamber 15d formed by enclosure means 15, member 14a and strainer 14k is adapted to receive a substantial amount of desiccant and is in communication through strainer 14h with outlet bore 14f.

It should be noted that with the exception of annular member 14a which is fixedly secured to the shell, all elements of connecting means 14 and chamber forming means 15 are removable from the dehydrator so that access to the interior thereof may be readily had for maintenance purposes. To assemble and charge the dehydrator with suitable desiccant, annular support 14g with chamber forming means 15 secured thereto is threadedly inserted into the shell to the position shown in Figure 2. With plug 14i removed from support bore 14h, desiccant may be admitted into the interior of chamber forming means 15 and through passage 14j into the main body of shell 10 until the dehydrator shell is properly fully filled with desiccant. Plug 14i is then threadedly inserted into bore 14h' closing off passage 14j and positioning strainer 14k transversely across the bore. Connector fitting 14d may then be threadedly secured to member 14a to complete the assembly operation.

When fluids are admitted through inlet means 13 into shell 10, oil and other contaminants in the fluid not removed by the action of strainer 13f are removed by the desiccant material adjacent the inlet strainer. Depending on the degree of coating and contamination of the desiccant, this desiccant also dehydrates the fluid. The fluid flowing through the desiccant in shell 10 passes through sleeve 15a into the second portion of desiccant contained within chamber forming means 15. At this point all contaminants have been removed from the fluid and the action of the desiccant within chamber means 15 is primarily only that of a dehydrator. The fluid then passes outwardly from the dehydrator through connecting means bore 14f having been properly dehydrated and purified, with strainer 14k preventing the passage of the desiccant outwardly with the fluid from chamber means 15.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A fluid dehydrator comprising: a shell adapted to hold suitable desiccant and having a pair of spaced openings forming an inlet and an outlet; means for connecting a first duct to said shell in sealed, fluid conductive relationship with said inlet; means for connecting a second duct to said shell in sealed, fluid conductive relationship with said outlet including tubular means sealingly secured to said shell and having an inner end within said shell; filter means secured to the inner end of the tubular means and having a portion forming a chamber for holding separately a portion of the desiccant within the shell, said chamber communicating directly with the inner end of the tubular means and communicating through said portion with the space exteriorly of the filter means within the shell; means for admitting desiccant into the shell including a passage through the tubular means within the shell and outwardly of said inner end providing a direct communication between the interior of the tubular means and said space; means for closing said passage when a preselected quantity of desiccant has been introduced through the tubular means to the chamber and said space; and means for straining fluids passed from the chamber into said tubular means, said means for straining fluids acting to retain desiccant within the dehydrator.

2. A fluid dehydrator comprising: a shell adapted to hold suitable desiccant and having a pair of spaced openings forming an inlet and an outlet; means for connecting a first duct to said shell in sealed, fluid conductive relationship with said inlet; means for connecting a second duct to said shell in sealed, fluid conductive relationship with said outlet, including a tubular member sealingly secured to said shell to extend into the shell through said outlet; means having a filter portion secured to the inner end of the tubular member and forming a chamber for holding separately a portion of the desiccant within the shell communicating with the inner end of the tubular member and with the interior of the shell, a passage through said chamber forming means outwardly of the filter portion providing a direct communication between the interior of the tubular member and the space within the shell surrounding the filter portion; means for controlling said passage comprising a tubular member axially insertable into said chamber forming means to close said passage; and a strainer carried by said last named means to extend across the outer end of the chamber when said last named means is inserted to close said passage.

3. Outlet means for use in a fluid dehydrator having a shell provided with an outlet opening, comprising: a first tubular member arranged to extend outwardly through the outlet opening and having a bore therethrough; a second tubular member threadedly secured to the first member to extend inwardly into the interior of the dehydrator and having a bore therethrough communicating with said first member bore; means for limiting the inward positioning of the second member relative to the first member; a perforate tubular sleeve extending inwardly from said second member; means for sealingly securing the outer end of the sleeve to said second member with the interior of the sleeve in communication with the bore of the second member; a closure member across the inner end of the sleeve; a strainer across said second member bore, said second member, sleeve, closure and strainer defining a chamber removable through said first member when desired; and means on a tubular member for connecting an outlet duct thereto to extend exteriorly of the dehydrator to have communication with the interior of the dehydrator through said chamber.

4. In a fluid dehydrator having a shell, an outlet means comprising: a member extending through the shell and having an inner portion provided with laterally opening ports outwardly adjacent an inner end thereof; a filter secured to said inner end and defining a chamber within a surrounding space defined by the shell; a control member adjustably disposed within the tubular member for alternatively preventing and permitting a passage of desiccant through the ports; and a foraminous member removably disposable across said inner end, whereby said control member may be adjusted for passage of desiccant through said ports and said foraminous member may be removed to permit concurrent filling of said chamber and said space with desiccant passed downwardly through the tubular member, and whereby, when said chamber and said space are filled with desiccant, said foraminous member may be disposed across said inner end to provide a fluid passing, desiccant retaining outer closure of said chamber, and said control member may be adjusted to close said ports, whereby fluid flow from said space to said tubular member is limited to through said filter.

5. The outlet means of claim 4 wherein the control member comprises a second tubular member threaded coaxially in the first mentioned tubular member.

6. The outlet means of claim 4 wherein the foraminous member is secured to the inner end of the control member.

7. The outlet means of claim 4 wherein the outlet means further includes an outer annular support adapted to be secured to the shell and having a threaded bore therethrough, and said tubular member is exteriorly threaded to be removably carried in the support to extend through the shell.

8. For use with a fluid dehydrator having a shell provided with an outlet opening, an outlet fitting comprising: tubular means extendible through the outlet opening to have an inner end portion disposed within the shell; filter means secured to said inner end portion and defining a chamber within the shell opening to the interior of the tubular means; a strainer across the interior of the tubular means for retaining desiccant within said chamber; and means sealingly securing the assembly of said tubular means, filter means, and strainer to the shell at said outlet opening while permitting removal of the assembly outwardly through the outlet opening when desired.

References Cited in the file of this patent

UNITED STATES PATENTS

| | | |
|---|---|---|
| 385,440 | Birkery | July 3, 1888 |
| 1,333,011 | Crady | Mar. 9, 1920 |
| 1,860,849 | Burch | May 31, 1932 |
| 2,104,519 | Hurn | Jan. 4, 1938 |
| 2,243,949 | Fox | June 3, 1941 |
| 2,365,149 | Anderson | Dec. 19, 1944 |